United States Patent Office 3,121,703
Patented Feb. 18, 1964

3,121,703
COMPOSITION COMPRISING A GLYCIDYL POLYETHER AND THE REACTION PRODUCT OF AN ACETONE-FORMALDEHYDE CONDENSATE AND A POLYALKYLENE GLYCOL
Mortimer T. Harvey, South Orange, N.J., assignor to Harvel Research Corporation, a corporation of New Jersey
No Drawing. Filed June 13, 1960, Ser. No. 35,450
5 Claims. (Cl. 260—42)

This invention relates to novel compositions of matter and to methods for preparing them and also to novel articles of manufacture in which said novel compositions of matter are components thereof. In one of its more specific aspects this invention is directed to novel compositions of matter comprising material (A) which is one or a combination of two or more glycidyl polyethers of polyhydric phenols and/or aliphatic polyhydric alcohols and material (B) which is one or a combination of two or more resinous acetone-formaldehyde organic reaction products modified with one or a combination of two or more polyalkylene glycols with or without material (C) which is one or more aldehyde-reactive polyhydric phenols and/or with or without material (D) which is one or more thermosetting phenol-aldehyde resins; and in another of its aspects is directed to such combinations of materials (A) and (B) with or without materials (C) and/or (D), together with material (E) which is one or a combination of two or more polybasic acids, or one or a combination of two or more amines, or a mixture of one or more of said amines and one or more of said amines and one or more of said polybasic acids.

In the U.S. Patent 2,839,481, which issued to me and P. L. Rosamilia on June 17, 1958, there are disclosed various compositions of matter comprising glycidyl ethers of polyhydric phenols and/or aliphatic polyhydric alcohols, in combination with acetone-formaldehyde organic reaction products or certain fatty acid modified acetone-formaldehyde organic reaction products, which combinations are cured with amines and/or polybasic acids.

While the compositions of matter and the articles of manufacture disclosed in said patent are very useful, I have discovered that said materials (A) may be combined with said materials (B), with or without (C) and (D), to provide novel compositions of matter which when cured with materials (E) are, for certain purposes, superior to the cured products disclosed in said patent.

Besides discovering that materials (A) were compatible with materials (B) and that such combinations, with or without (C) and/or (D) were capable of being cured with materials (E), I was surprised to discover that said materials (A) were compatible with said materials (B) in all proportions and that all of such combinations were capable of being cured with said materials (E). I was also surprised to discover that said materials (B) were more readily soluble in said materials (A); and that by properly choosing materials (A) and (B) it is possible to obtain solutions thereof of very low viscosities, which sometimes is a prerequisite in commercial practice; curing may be effected with significant reduction and sometimes complete obviation of gassing thereby to provide denser cured products; and cured combinations of materials (A) and (B) may be produced which have better flexibility characteristics and may vary physically from low and high temperature resistant tough horny solids to readily flexible, rubbery solids.

While the ratio by weight of material (A) to material (B) may be varied without limitation in the production of combustions thereof which find utility as commercial compositions of matter, I prefer such combinations wherein the ratio by weight of material (A) to material (B) is 1–30 parts by weight of material (A) to 3 parts of material (B). The ratio by weight of the curing agent, material (E) may also vary over wide limits, depending upon the particular material (E) employed, the ratio by weight of materials (A) and (B) in the combination and also the speed of cure desired.

The materials (E) employed for curing said combinations of said materials (A) and (B) with or without (C) and (D) are those which are capable of curing the particular material (A) component thereof. Of course, it is well known and understood by those skilled in the art that some of said curing agents are capable of curing some of said materials (A) without the application of external heat thereto, while others require the application of external heat for curing.

Said glycidyl polyethers employed in the practice of this invention may be in the monomeric and/or polymeric states, and have an epoxide equivalency greater than 1. The glycidyl polyethers of the polyhydric phenols are those of either mononuclear or polynuclear phenols. It is to be understood that the term "glycidyl polyethers of polyhydric phenols or aliphatic polyhydric alcohols", as employed in the present description and claims, means such polyethers in the monomeric and/or polymeric state.

The amount of material (C) employed in combination with materials (A) and (B) in general is about 2–25 parts by weight of material (C) per 100 parts of the combined weights of materials (A) and (B); and the amount of material (D) employed in combination with materials (A) and (B) is 5–50 parts by weight of material (D) per 100 parts of the combined weights of materials (A) and (B), and for some purposes, when both (C) and (D) are employed in combination with (A) and (B), I prefer that the sum of the weights of (C) and (D) is no greater than the sum of the weights of (A) and (B).

Said glycidyl polyethers of the aliphatic polyhydric alcohols are obtainable by practicing the methods known to the art, an example of which is to react such alcohol with epichlorhydrin or glycerol dichlorhydrin in the presence of a suitable acidic catalyst, such as boron trifluoride and then converting said reaction product to the polyepoxide by employing suitable alkaline agents, such as sodium hydroxide, sodium aluminate, etc. Examples of some of said glycidyl polyethers are those of such alcohols as diethylene glycol, propylene, glycol, glycerol, etc., and all of which have a 1,2-epoxide equivalency greater than 1.

The glycidyl polyethers of polyhydric phenols are obtainable by reacting a polyhydric phenol with epichlorhydrin in basic medium at about 50° C. to 150° C. with use of more than 1 mole of epichlorhydrin per equivalent of phenolic hydroxyl group of the phenol and a slight stoichiometric excess of base such as about 2% to 3% excess sodium or potassium hydroxide. The reaction is effected by heating for several hours and the product is then separated from formed salt, excess base, and any unreacted epichlorhydrin. Glycidyl polyether of a dihydric phenol, which product, instead of being a single simple compound, is generally a complex mixture of glycidyl polyethers, but the principal product may be represented by the formula:

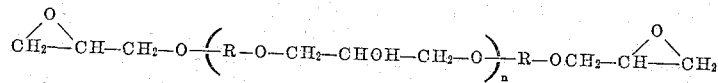

wherein $n$ is an integer of the series 0,1,2,8 . . . , and R represents the divalent hydrocarbon radical of the dihydric phenol. While for any single molecule of the polyether $n$ is an integer, the fact that the obtained polyether is a mixture of compounds causes the determined value for $n$, e.g. from molecular weight measurement, to be an average which is not necessarily zero or a whole number. Although the polyether is a substance primarily of the above formula, it may contain some material with one or both of the terminal glycidyl radicals in hydrated form and in any case the 1,2-epoxide equivalency is greater than 1.

The simplest of the polyethers is the diglicidyl diether of a dihydric phenol. It contains a single divalent aromatic hydrocarbon radical from the dihydric phenol and has two glycidyl radicals linked thereto by etheral oxygen atoms. More generally, the polyether of dihydric phenols is of more complex character and contains two or more aromatic hydrocarbon radicals alternating with glyceryl groups in a chain which are linked together by intervening etheral oxygen atoms.

The 1,2-epoxide equivalency of the glycidyl polyether refers to the number of 1,2-epoxy groups.

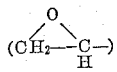

contained in the average molecule of the polyether. The 1,2-epoxide equivalency is thus dependent upon the molecular weight and the epoxide value which is measured as gram equivalents of epoxide per 100 grams of polyether. The 1,2-epoxide value is determined by heating a weighed sample of polyether with an excess of 0.2 N-pyridinium chloride in chloroform solution at the boiling point under reflux for two hours whereby the pyridinium chloride hydrochlorinates the epoxy groups to chlorhydrin groups. After cooling, the excess unreacted pyridinium chloride is back titrated with 0.1 N-sodium hydroxide in methanol to the phenolphthalein end point. The epoxide value is calculated by considering one HCl as equivalent to one epoxide group. This method is used for obtaining all epoxide value discussed herein.

Any of the various polyhydric phenols used in preparing the polyethers include mononuclear phenols such as resorcinol, catechol, hydroquinone, methyl resorcinal, etc. or polynuclear phenols like 2,2-bis(4-hydroxyphenol) propane which is termed bis-phenol A herein for convenience, 4,4-dihydroxy-benzophenone, bis - (4 - hydroxyphenyl)-methane, 1,1-bis(4-hydroxyphenol)-ethane, 1,1-bis(4-hydroxyphenyl) isobutane, 2,2-bis(4-hydroxyphenol) butane, 2,2-bis(4-hydroxy-2-methylphenyl) propane 2,2-bis (4 hydroxy-2-tertiary butylphenyl) propane, 2,2-bis(2hydroxy naphthyl) pentane, 1,5-dihydroxynaphthalene, etc., as well as more complex polyhydric phenols such as pyrogallol, phloroglucinol, and novolac resins from condensation of a phenol with an aldehyde in the presence of an acidic condensation catalyst. Preparation of glycidyl polyether of novolac resin is described in Example 27 of German Patent No. 676,117.

Other examples of such glycidyl polyethers of bis-phenols are those obtainable by reacting epichlorhydrin in a basic medium with the organic reaction products produced by reacting a material selected from the class consisting of hydroxy benzene, naphthol, anthranol and their homologues with a phenol having an unsaturated hydrocarbon substituent, with such reaction products being shown in the U.S. patent to M. T. Harvey, No. 2,317,607, issued April 27, 1943, and glycidyl polyether of certain of said reaction products being shown in U.S. patent to D. Wasserman, No. 2,665,266. Still other examples of said glycidyl polyethers of bis-phenols are those which may be derived from any of the other bis-phenols produced according to said Harvey patent. Such bis-phenols may be reacted with epichlorhydrin in the presence of an alkali employing in general the procedure set forth in the aforesaid Wasserman patent to produce the glycidyl polyethers of said other bis-phenols.

The following are some illustrative specific examples of materials (A) which may be used in the practice of this invention:

"Shell Epon 562," which is a normally liquid glycidyl polyether of glycerine and has an epoxide value of 140–165;

Glycidyl polyether of 5-pentadecyl resorcinol, having melting point of 19–23° C. and epoxide value of 315;

Product IE of example 1 of Wasserman U.S. Patent 2,665,266, which is glycidyl polyether of reaction product of hydroxy benzene and cashew nut shell liquid and is normally liquid and has an epoxide value of 400–500;

And various monomeric and polymeric glycidyl polyethers of 2,2-bis, parahydroxy phenyl propane having the following melting points and epoxide value and known on the market as follows:

"Shell Epon 828" having melting point of 8–12° C. and epoxide value of 190–210.

"Shell Epon 864" having melting point of 40–45° C. and epoxide value of 300–375.

"Shell Epon 1001" having a melting point of 64–76° C. and epoxide value of 430–525.

"Shell Epon 1004" having melting point of 95–105° C. and epoxide value of 870–1025.

"Shell Epon 1007" having a melting point of 127–133° C. and epoxide value of 1550–2000.

"Shell Epon 1009" having a melting point of 145–155° C. and epoxide value of 2400–4000.

Said materials (B) may be produced in the manner set forth in the copending U.S. patent application 590,112, filed June 8, 1956, of myself and P. L. Rosamilia, and being U.S. Patent 2,944,989, of July 12, 1960. The resinous acetone-formaldehyde organic reaction products employed in the production of said materials (B) are those produced by reacting acetone and formaldehyde under alkaline conditions. In general, the mole ratio of said reactants is 1 mole of acetone to 2–5 moles of formaldehyde and the resultant acetone-formaldehyde reaction products employed in the preparation of materials (B) are those which are soluble in 25% their weight of water to clear solutions, and are further characterized as follows: An 80% aqueous solution thereof has a viscosity at 25° C. of at least 300 centipoises and, for most purposes, no greater than 100,000 centipoises; when a mass consisting of 100 grams of such 80% aqueous solution has uniformly distributed therethrough 5 grams of lime, and then said mass is allowed to remain for 16 hours in an oven maintained at 300° F., at the end of that period, the resultant mass is solid and infusible at 300° F.; when a 100 gram sample of said resinous acetone-formaldehyde organic reaction product is maintained at 150° C. under reduced pressure of 40 mm. of mercury pressure, a residue is formed, said residue being undistillable under said temperature and pressure conditions and measuring at least 60% of the original weight of said sample. By the term "acetone-formaldehyde organic reaction product" employed throughout this description and claims, I obviously mean polymerized or polymers of products of reaction of acetone and formaldehyde. Some specific examples of said acetone-formaldehyde organic reaction products which may be employed in the production of said materials (B) are products A–D, I–Q, X, Z, AA–FF of the U.S. Patent 2,828,820, issued to P. L. Rosamilia and me on April 1, 1958.

The polyalkylene glycols employed in the production of said materials (B) are those which are at least 50% soluble in water at 20° C., having average molecular weight of at least about 100 and generally in the range of about 100–6000. Specific examples of some of them are liquid polyethylene glycols having average molecular weight of 200–600, solid or wax-like polyethylene glycols known on the market as "Carbowax" and having average molecular weights of 1000–6000, diethylene glycol, triethylene glycol, dipropylene glycol, polypropylene glycols of average molecular weight up to about 425.

In general, materials (B) may be produced by heating together for reaction 1–10 parts by weight of (1) one or a combination of two or more of resinous acetone-formaldehyde reaction products and 1 part by weight of (2) one or a combination of two or more of said polyalkylene glycols. Said (1) and (2) in the aforesaid proportions may first be mixed together and then the resulting mass is maintained in the temperature range from about 220° F. to any desired suitable elevated temperature for a period of time to assure the desired reaction. In general, it is preferred that said mass be maintained in the temperature range of about 220–440° F. or higher depending upon the boiling point of the glycol employed and the maximum temperature is below such boiling point. The mixture is maintained in said temperature range for a period of time which may be in the range of one-quarter to 24 hours, and in any case, until substantial reaction has occurred, and before the mass is in such condition that it is not liquid at 80° C. That is to say that the time and temperature of reaction is controlled so that the resultant reaction mass of (1) and (2), which is material (B) which when liquid or not at 70° F. is liquid at 80° C., that is capable of flow at 80° C.

The following are illustrative examples of some of said materials (B) which may be employed in the practice of this invention.

EXAMPLE (B-1)

300 grams of an 80% aqueous solution of resinous acetone-formaldehyde organic reaction product, identified as product A in Example A of U.S. Patent 2,828,820 was charged into a glass reaction vessel and then there was added thereto 212 grams of diethylene glycol. The components in the vessel were heated together to a temperature of about 210° C. and then the resultant organic reaction mass, known as product (B-1) hereinafter, was cooled to room temperature and at that temperature was a liquid having a viscosity at 25° C. of approximately 4000 centipoises, and measured about 400 grams and being water-insoluble.

EXAMPLE (B-2)

900 grams of an 80% aqueous solution of resinous acetone-formaldehyde organic reaction product, identified as product B in Example B of U.S. Patent 2,828,820 was charged into a reaction vessel and then there was added thereto 600 grams of triethylene glycol. The components in the vessel were heated together to a temperature of about 130° C. and maintained at that temperature until the viscosity of a sample thereof at 25° C. was about 50,000 centipoises. At this stage, the mass was immediately cooled to room temperature and is hereinafter known as product (B-2).

EXAMPLE (B-3)

112.5 pounds of an 80% aqueous solution of resinous acetone-formaldehyde organic reaction product, identified as product A in Example A of U.S. Patent 2,828,820 was charged into an aluminum kettle, and then was added thereto 90 parts of polyethylene glycol, average molecular weight of 400. The mass was stirred and heated to a temperature of approximately 360° F. whereupon apparently exotherm occurred and the temperature rose to 380° F. The external source of heat was removed and the mass held for a 24 cm. flow on fluidmeter and then was screened and cooled to room temperature. The mass measured 149 pounds, is hereinafter known as product (B-3), has a viscosity at 25° C. of 25,500 centipoises and specific gravity at 25° C. of about 1.18.

EXAMPLE (B-4)

16 pounds, 11 ounces of an 80% aqueous solution of product A referred to in Example (B-1) herein and 4 pounds, 8 ounces of polyethylene glycol having an average molecular weight of approximately 400 were charged into a reaction vessel wherein they were mixed together. The mixture was heated to and maintained at 130° C. until a sample thereof when cooled to room temperature was of a tacky, gummy nature. At this stage, the mass was immediately poured into shallow pans and cooled at room temperature and at that temperature was a gummy, tacky mass capable of flow and is hereinafter known as product (B-4).

EXAMPLE (B-5)

300 parts of 80% aqueous solution of resinous acetone-formaldehyde organic reaction product identified as product I of U.S. Patent 2,828,820 were charged into a glass reaction vessel and then there was added thereto 75 parts of diethylene glycol. These components were mixed together and then heated to a temperature of approximately 130° C. and maintained at that temperature until a sample thereof had a viscosity of 75,000 centipoises at 25° C. The mass was then cooled immediately to room temperature and is hereinafter known as product (B-5).

EXAMPLE (B-6)

Follow the same procedure as that of Example (B-5) but employ 125 parts of an 80% aqueous solution of resinous acetone-formaldehyde organic reaction product, identified as product N in U.S. Patent 2,828,820, 100 parts of polypropylene glycol having an average molecular weight of approximately 300 and terminating reaction when a sample of the mass has a viscosity of 25° C. of approximately 15,000. The mass is immediately cooled to room temperature and is hereinafter known as product (B-6).

EXAMPLE (B-7)

300 parts of 80% aqueous solution of resinous acetone-formaldehyde organic reaction product, identified as product R of Example 1 of U.S. Patent 2,828,820, and 200 parts of polyethelyne glycol having an average molecular weight of 300 were mixed together in a reaction vessel and were heated to a temperature of approximately 150° C. and maintained at that temperature until a sample thereof when cooled to 25° C. had a viscosity of approximately 5,000 centipoises, whereupon the mass was immediately cooled to room temperature and is hereinafter known as product (B-7) having a viscosity at 25° C. of approximately 5,000.

EXAMPLE (B-8)

300 parts of an 80% aqueous solution of a resinous acetone-formaldehyde organic reaction product, identified as product A of Example A of U.S. Patent 2,828,820 and 240 parts of polyethylene glycol having an average molecular weight of approximately 6,000 were heated together to 130° C. and maintained at that temperature until a heavy, stringy body was attained whereupon heating was immediately discontinued, and the mass immediately cooled to room temperature and is hereinafter known as product (B-8) and was of a gummy, tacky nature.

EXAMPLE (B-9)

300 parts of an 80% aqueous solution of a resinous acetone-formaldehyde organic reaction product, identified as product E of Example E of U.S. Patent 2,828,820 with said solution having a viscosity of 5,000 centipoises at 25° C. and 240 parts of diethelyene glycol were heated to 135° C. and maintained at that temperature until a sample thereof when cooled to room temperature was a gummy, semi-solid mass capable of cold flow. At this stage, the mass was immediately cooled to room temperature and at that temperature was a gummy mass in the nature of a semi-solid and capable of flow at 70° F. and is hereinafter known as product (B-9).

EXAMPLE (B-10)

1500 parts of an 80% aqueous solution of a resinous acetone-formaldehyde organic reaction product, identified as product A of Example A of U.S. Patent 2,828,820 and 250 parts of triethylene glycol were heated together to approximately 140° C. and maintained at that temperature until a sample thereof when cooled to room temperature was a gummy mass in the nature of a semi-solid. At this stage, the mass was immediately cooled to room temperature and at that temperature was found to be a gummy mass, hereinafter known as product (B-10).

All of the materials (B) employed in the practice of this invention, examples of which are materials (B-1) to (B-10), whether liquid or not at room temperature, are all liquid at 80° C.

Instead of employing the particular resinous acetone-formaldehyde reaction products as set forth in the foregoing examples, any of the other specific resinous acetone-formaldehyde reaction products heretofor mentioned may be substituted therefor and other polyalkylene glycols may be substituted for those in said examples and the ratios by weight of the resinous organic acetone-formaldehyde reaction products to the polyalkylene glycols employed may be varied within the limits heretofor set forth to provide a large number of additional materials (B), all of which like materials (B-1) to (B-10) are liquid at 80° C. and may be employed as starting materials in the practice of the present invention.

Illustrative examples of some of said Materials (C) which may be employed in the practice of this invention are resorcinol, catechol, hydroquinones, cardol, etc.

Examples of some of said materials (D) which may be employed in the practice of this invention are known on the market as the following phenol-aldehyde thermosetting resins: "G.E. R-108" (allyl phenol-formaldehyde); "Varcum 2869-B" (cresylic acid-formaldehyde); "Varcum 148" ((xylenol-formaldehyde); cardanol-formaldehyde; tertiary butyl phenol-formaldehyde; cardanol-furfuraldehyde, etc.

Examples of some of said materials (E) which are capable of acting as curing agents or cross-linking agents for said materials (A) alone and also for the novel compositions of this invention are: The amines may be primary, secondary and tertiary aliphatic amines, aromatic amines, cyclic amines, heterocyclic amines, polyfunctional amines, etc., and specific examples of some of them are propyl amine, diethyl amine, methyl benzyl amine, aniline, naphthylamine, dimethyl aniline cyclohexylamine, N,N diethyl cyclohexylamine, pyridine, alkyl pyridine, quinoline, N,N dimethylalpha benzyl amine, ethyl morpholine, piperidine, melamine, dialkyl melamine, dicyandiamide, ethylene diamine, propylene diamine, 1,6 hexamethylene diamine, diethylene triamine, dipropylene triamine, triethylene tetramine, tetraethylene pentamine, 3-diethyl-aminopropylamine, etc.; the polycarboxylic organic acids may be (a) aromatic acids and anhydrides such as phthalic acid, tetraphthalic acid, phthalic anhydride, monochlorophthalic anhydride, dichlorophthalic anhydride, dihydrophthalic anhydride and tetrahydrophthalic anhydride, 1,2-naphthalic anhydride, 2,3-naphthalic anhydride; (b) alkyl polybasic carboxylic acids and anhydrides such as oxalic acid, succinic acid and anhydride, adipic, sebacic, azelaic acids and their polyanhydrides, chlormaleic anhydride, itaconic acid and its anhydride, etc.; (c) maleic anhydride and its adducts which may be produced by Diels-Alder synthesis such as hexachlorocylopentenyl succinic anhydride, tetrapropenyl succinic anhydride, dodecenyl succinic anhydride, cyclopentenyl succinic anhydride; the reaction product of maleic anhydride with eleostearic acid anhydride; the reaction product of unsaturated terpenes such as limonene, pinene, camphene with maleic anhydride. Other examples of diene adducts of maleic anhydride are 4-cyclohexenel, 2-dicarboxylic anhydride, 1,5-dimethyl-2,3,4,6,7,8, hexahydronaphthalene-3,7,8-tetracarboxylic di-anhydride. By the term "polybasic acid" as employed in the description and claims, I mean the acid or anhydride thereof because they are obvious equivalents.

The novel compositions of this invention are useful in a wide variety of different fields. They may be employed as potting compounds, encapsulating materials for electrical components, as adhesives for metals, glass fibres, rockwool, etc. They may be combined with fillers and may be employed as cold-setting cements and are especially suitable for that purpose because of their trowelability. They may be employed as adhesives for floor coverings and, in fact, may be employed as floor material. The presence of materials (B) in combination with materials (A) imparts to the cured combinations flexibility, heat stability and also impact strength.

The following are specific examples of some of the novel compositions of this invention as well as such compositions together with a curing agent therefor and also such compositions in the cured state, said examples being given merely by way of illustration and not limitation, with all parts being given by weight unless otherwise specified:

Example 1

10 parts of product (B-1) and 10 parts of "Shell Epon 828" were combined to uniformity to provide novel product P1. Then to all of product P1 there were added 2 parts of diethylene triamine which was intimately admixed therewith by rapid stirring. The resultant mass without the application of external heat was accompanied by exothermic reaction and within 10 minutes was converted to a tough, horny, substantially infusible mass. Product P1 may be employed as encapsulating material for electrical components by placing the component to be encapsulated in a form into which is poured the combination of product P1 and the curing or cross-linking agent, diethylene triamine in the proportion given immediately after the combination is produced whereupon within 10 minutes thereafter and without the application of external heat the combination is converted into the solid and infusible state to act as a protective and electrical insulation shielding mass therefor.

Example 2

20 parts of product (B-2) and 10 parts of "Shell Epon 562" were combined to uniformity to provide novel product P2. Then to all of said product P2 was added 3 parts of triethylene tetramine which was intimately admixed therewith by rapid stirring. Without the application of any external heat, the mass accompanied by exothermic reaction, within 20 minutes was converted to a tough, strong, substantially infusible mass. Said novel product P2, like product P1, may be employed as encapsulating material and cured with the particular amine set forth in the present example.

Example 3

50 parts of product (B-3) and 50 parts of product IE of Example 1 of U.S. Patent 2,665,266 were combined to uniformity to provide novel product P3. Then to all of product P3 there were added 8 parts of diethylene triamine which was intimately admixed therewith by rapid stirring. The resultant mass, without the application of external heat, was accompanied by exothermic reaction and at the end of 1 hour was found to be a tough, hard, substantially infusible resinous mass having good rigidity and impact strength characteristics. Said product P3 also finds utility the same as that for product P1.

Example 4

25 parts of product (B-4) and 25 parts of said glycidyl polyether of 5-pentadecyl resorcinol herein before specifically described were combined to uniformity to provide novel product P4. Then 8 parts of diethylene triamine may be intimately admixed therewith to provide a combination which, without the application of external heat thereto, and when examined at the end of 2 hours, was found to be a rubbery, flexible, substantially infusible mass. If desired, said product P4 may be thinned with 50 parts of an organic solvent consisting of 67 parts of xylenol and 33 parts of methyl ethyl ketone and said amine may be added thereto and the resultant mass may be applied as a thin coating to paper or cloth composed of natural and/or synthetic fibres, glass fibres, etc., or matted fibers. Then the so-coated materials may be passed through an oven at 275° C. over a 15-20 minute period to drive off the solvent and to convert the thin film of organic mass into a tightly adherent, continuous coating or film. The addition of the solvent not only served to provide a low viscosity material but also increased the pot life of the combination.

*Example 5*

10 parts of product (B-5) and 20 parts of "Shell Epon 864" were warmed together to provide novel product P5 which was thinned with 18 parts of a mixture consisting of 12 parts of xylol and 6 parts of methyl ethyl ketone. Then there was added thereto and uniformly distributed therethrough 2 parts of diethylene triamine. Immediately thereafter, a woven or matted glass or asbestos fabric is saturated therewith. The so-saturated fabric is passed through an oven, over a period of about 20 minutes, at 300–400° F. to provide such fabric with a substantially solid and infusible impregnant end coating.

*Example 6*

20 parts of product (B-6) and 20 parts of "Shell Epon 864" were heated to a temperature of approximately 50° C. and stirred to uniformity to provide novel product P6 to all of which were added 75 parts of a solvent consisting of 50 parts xylol and 25 parts of methyl ethyl ketone and also 4 parts of diethylene triamine. The components were agitated to uniformity and the resultant mass was spread in a thin film on one face of a woven glass fabric. Another glass fabric was placed thereover, and pressure applied to produce a laminate which was passed through an oven at 275° F. for a period of 15 minutes, whereupon the solvent had evaporated therefrom and the organic mass converted to the substantially infusible state acting as a binding agent for such two-ply laminated glass fabric.

*Example 7*

50 parts of "Shell Epon 828," 50 parts of product (B-3) and 10 parts of resorcinol were warmed together for solution and then cooled to 26° C. to provide a novel product hereinafter known as product P7 which may be combined with 6-10 parts of diethylene triamine and such combinations may be used for filling voids in transformer coils, motors and the like and for coating of electrical splicings. Such combination may be trowelled on floors and will set to the substantially infusible state in a relatively short period of time to provide water and oil resistant coatings. Such combinations, either with or without such fillers, also find utility as seals in the bell and spigot joints of ceramic pipes or metal pipes.

*Example 8*

20 parts of "Shell Epon 562," 20 parts of product (B-3) and 5 parts of "G.E. R-108" were warmed together to uniformity and such mass is hereinafter known as product P8 which is a casting resin which may be cured in the absence of external heat and employing therewith 4 parts of triethylene tetramine.

*Example 9*

50 parts of "Shell Epon 828," 50 parts of product (B-3), 2 parts of resorcinol and 5 parts of "Varcum 148" were warmed and mixed to uniformity to provide product P9 which may be employed as a casting resin and to which 10 parts of diethylene triamine are added and uniformly distributed therethrough whereupon, without the application of external heat, the mass is converted to the substantially solid and infusible state.

*Example 10*

20 parts of product (B-3), 20 parts of "Shell Epon 828" and 20 parts of phthalic anhydride were all mixed together and may be heated at 150° C. to provide an intermediate fluid reaction product which may be employed for encapsulating motors, coils, rotary transformers and the like and which is thereafter cured in an oven at 150° C. for a period of 16 hours to convert the mass into the substantially solid and infusible state to act as a protective covering which is tough, water-resistant and of high dielectric strength. If desired, the 3 component mix may be added directly to the parts to be encapsulated and then such covered parts may be maintained in an oven at 150°–180° C. for a period of 24 to 48 hours whereupon the organic mass is converted to said solid and infusible state.

*Example 11*

50 parts of product (B-1), 50 parts of "Shell Epon 828," 2 parts of resorcinol and 50 parts of adipic anhydride were combined to uniformity and thinned with 60 parts of a solvent consisting of 40 parts of xylol and 20 parts of methyl ethyl ketone. The mass was spread as a thin film on woven glass cloth to coat and impregnate the fibres thereof. The so-coated and impregnated cloth was maintained in an oven at 150° C. for a period 40 hours whereupon the solvent was evaporated off and the organic material had been converted into a substantially solid and infusible coating and impregnant therefor.

*Example 12*

50 parts of "Shell Epon 1001," 50 parts of product (B-10), 5 parts of "G.E. R-108" and 50 parts maleic anhydride were heated to a temperature of approximately 100° C. and while at that temperature were stirred to uniformity. To this mass was added 100 parts of a thinner consisting of 65 parts of xylol and 35 parts of methyl ethyl ketone. The resultant mass was stirred and then employed as a saturant and impregnant for woven asbestos fabric which was subsequently maintained in an oven at 160° C. for a period of 36 hours to drive off the solvent and to cure the remaining organic components thereby to convert them to the substantially infusible state.

*Example 13*

50 parts of "Shell Epon 828," 50 parts of product (B-3), 2 parts of resorcinol and 5 parts of "Varcum 148" and 55 parts of phthalic anhydride were combined to uniformity. The resultant mass was poured into a container in which was located a transformer coil to be encapsulated. Then the container together with the products therein was maintained for 48 hours in an oven maintained at 150° C. At the end of that period, the encapsulating mass had been converted to the substantially solid and infusible state to provide a water-resistant and oil-resistant covering of good dielectric strength for said coil.

All of said materials (A) employed in the practice of this invention are capable of being cured to the infusible state when 100 parts thereof are in intimate combination with 10 parts of diethylene tetramine or 50 parts of phthalic anhydride and such combinations are thereafter allowed to remain for 48 hours in an oven maintained at 150° C. In fact, in practically all cases said materials (A) are capable of being cured to the infusible state without the application of any external heat thereto when such proportion of said polyamine is in combination therewith.

In one of the more specific aspects of this invention, I prefer that in the production of said materials (B) that there be employed such polyalkylene glycols which are liquid at 70° F. and have an average molecular weight no greater than 700 and such resinous acetone-formaldehyde organic reaction products, 80% aqueous solution of which have viscosities at 25° C. of no greater than 20,000 centipoises; I also prefer to employ materials (B) which at 25° C. have viscosities no greater than 200,000 centipoises for certain uses.

The various novel combinations of this invention may be modified by adding other components thereto, examples of which are certain "Thiokols." The "Thiokols" are normally liquid polymers which in chemical structure are those having the repeating unit of

—SSCH$_2$CH$_2$OCH$_2$OCH$_2$CH$_2$— and the terminals being SH groups, with said liquid polymers having average molecular weights of 300–4000.

*Example 14*

50 parts of "Shell Epon 828," 50 parts of Thiokol LP-8 and 50 parts of product (B-3) were mixed to uniformity and then there was added thereto and immediately stirred therein 12 parts of diethylene triamine and the resulting mass was employed to encapsulate a transformer and without the application of external heat, said mass having a pot life of 10–15 minutes was, after allowed to remain overnight, found to be a rubbery mass which retained its shape when heated to 300° F.

Throughout this entire description and claims, all parts are by weight unless otherwise specified.

Since certain changes in carrying out the aforesaid process and certain modifications in the compositions which embody the invention may be made without departing from its scope, it is intended that all matter contained in the description shall be interpreted as illustrative and not in a limiting sense.

It is also to be understood that the following claims are intended to cover all the generic and specific features of the invention herein described and all statements of the scope of the invention, which as a matter of language might be said to fall therebetween; and that they are intended to be inclusive in scope and not exclusive, in that, if desired, other materials may be added to our novel compositions of matter herein claimed without departing from the spirit of the invention. Particularly it is to be understood that in said claims, ingredients or components recited in the singular are intended to include compatible mixtures of said ingredients wherever the sense permits.

I claim:

1. A composition of matter comprising (A) glycidyl polyether of a compound selected from the group consisting of polyhydric phenols and aliphatic polyhydric alcohols intimately combined with (B) organic reaction mass liquid at 80° C. and produced by reacting together 1–10 parts by weight of (1) resinous acetone-formaldehyde organic reaction product and 1 part by weight of (2) polyalkylene glycol which is at least 50% by weight soluble in water at 20° C., the ratio by weight of (A) to (B) being 1–30 parts of (A) to 3 parts of (B), said (1) being characterized as follows: said (1) being soluble in 25% of its weight of water; an 80% aqueous solution of (1) having a viscosity at 25° C. of at least 300 centipoises and no greater than 100,000 centipoises; when a mass consisting of 100 grams of an 80% aqueous solution of (1) has 5 grams of lime uniformly distributed therethrough and said mass is allowed to remain for 16 hours in an oven maintained at 300° F., at the end of that period, the resultant mass is solid and infusible at 300° F.; when a 100 gram sample of (1) is maintained at 150° C. under reduced pressure of 40 mm. of mercury pressure, a residue is formed, said residue being undistillable under said temperature and pressure conditions and measures at least 60 grams, said (A) having an epoxide equivalency greater than 1, said (2) having a maximum average molecular weight of 6,000.

2. A composition of matter comprising (X) a composition of matter as defined in claim 1 cured with (E) a curing agent selected from the group consisting of (a) amines, (b) polybasic acids and mixtures of (a) and (b) capable of curing said (A).

3. A composition of matter comprising (A) glycidyl polyether of a polyhdric phenol intimately combined with (B) organic reaction mass liquid at 80° C. and produced by reacting together 1–10 parts by weight of (1) resinous acetone-formaldehyde organic reaction product and 1 part by weight of (2) polyalkylene glycol which is at least 50% by weight soluble in water at 20° C., the ratio by weight of (A) to (B) being 1–30 parts of (A) to 3 parts of (B), said (1) being characterized as follows: said (1) being soluble in 25% of its weight of water; an 80% aqueous solution of (1) having a viscosity at 25° C. of at least 300 centipoises; when a mass consisting of 100 grams of an 80% aqueous solution of (1) has 5 grams of lime uniformly distributed therethrough and said mass is allowed to remain for 16 hours in an oven maintained at 300° F., at the end of that period, the resultant mass is solid and infusible at 300° F.; when a 100 gram sample of (1) is maintained at 150° C. under reduced pressure, a residue is formed, said residue being undistillable under said temperature and pressure conditions and measures at least 60 grams, said (A) having an epoxide equivalency greater than 1, said (2) having an average molecular weight of aproximately 400.

4. A composition of matter as defined in claim 1, with (1) being such that an 80% aqueous solution thereof having a viscosity at 25° C. no greater than 20,000 centipoises and (2) being liquid and having an average molecular weight no greater than 700.

5. A composition of matter comprising (A) glycidyl polyether of a compound selected from the group consisting of polyhydric phenols and aliphatic polyhydric alcohols intimately combined with (X) a material selected from the group consisting of aldehyde reactive polyhydric phenols, thermo-setting phenol-aldehyde resins and liquid polymers which in chemical structure have repeating units of —SSCH$_2$CH$_2$OCH$_2$OCH$_2$CH$_2$— and the terminals being SH groups, said polymers having average molecular weights of 300–4,000; and (B) organic reaction mass liquid at 80° C. and produced by reacting together 1–10 parts by weight of (1) resinous acetone-formaldehyde organic reaction product and 1 part by weight of (2) polyalkylene glycol which is at least 50% by weight soluble in water at 20° C., the ratio by weight of (A) to (B) being 1–30 parts of (A) to 3 parts of (B), said (1) being characterized as follows: said (1) being soluble in 25% of its weight of water; an 80% aqueous solution of (1) having a viscosity at 25° C. of at least 300 centipoises and no greater than 100,000 centipoises; when a mass consisting of 100 grams of an 80% aqueous solution of (1) has 5 grams of lime uniformly distributed therethrough and said mass is allowed to remain for 16 hours in an oven maintained at 300° F., at the end of that period, the resultant mass is solid and infusible at 300° F.; when a 100 gram sample of (1) is maintained at 150° C. under reduced pressure of 40 mm. of mercury pressure, a residue is formed, said residue being undistillable under said temperature and pressure conditions and measures at least 60 grams, said (A) having an epoxide equivalency greater than 1, said (2) having a maximum average molecular weight of 6,000.

References Cited in the file of this patent

UNITED STATES PATENTS

| | | |
|---|---|---|
| 2,839,481 | Harvey et al. | June 17, 1958 |
| 2,944,989 | Harvey et al. | July 12, 1960 |